(12) United States Patent
Stepanski

(10) Patent No.: US 10,005,246 B2
(45) Date of Patent: Jun. 26, 2018

(54) METHODS FOR MAKING INTERIOR PANELS FOR MOTOR VEHICLES

(71) Applicant: Faurecia Interior Systems, Inc., Auburn Hills, MI (US)

(72) Inventor: David J. Stepanski, West Bloomfield, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 960 days.

(21) Appl. No.: 13/973,053

(22) Filed: Aug. 22, 2013

(65) Prior Publication Data

US 2015/0054207 A1    Feb. 26, 2015

(51) Int. Cl.
*B29C 70/54*       (2006.01)
*B29C 51/02*       (2006.01)
*B29C 43/02*       (2006.01)
*B29D 99/00*       (2010.01)
*B29C 70/46*       (2006.01)
*B60R 13/00*       (2006.01)
*B29K 309/08*      (2006.01)
*B29K 301/00*      (2006.01)
*B29L 31/30*       (2006.01)
*B29C 43/36*       (2006.01)

(52) U.S. Cl.
CPC .......... *B29C 70/545* (2013.01); *B29C 43/021* (2013.01); *B29C 51/02* (2013.01); *B29C 70/46* (2013.01); *B29D 99/001* (2013.01); *B29C 2043/3665* (2013.01); *B29K 2301/00* (2013.01); *B29K 2309/08* (2013.01); *B29L 2031/30* (2013.01)

(58) Field of Classification Search
CPC .................................................... B29C 70/545
USPC .................. 264/154–156, 257, 258
See application file for complete search history.

(56) References Cited

U.S. PATENT DOCUMENTS

| 2,289,177 | A | * | 7/1942 | Chandler | B26F 1/24 |
| | | | | | 264/156 |
| 2,611,434 | A | * | 9/1952 | Mugler | B26F 1/24 |
| | | | | | 219/229 |
| 2,978,376 | A | * | 4/1961 | Hulse | B29C 51/145 |
| | | | | | 156/222 |
| 3,551,232 | A | * | 12/1970 | Thompson | B29C 51/16 |
| | | | | | 156/286 |
| 4,102,975 | A | | 7/1978 | Doerer | |
| 4,486,372 | A | * | 12/1984 | Millard | B29C 33/0033 |
| | | | | | 156/242 |

(Continued)

FOREIGN PATENT DOCUMENTS

JP        59089211 A       5/1984
JP        04327251 A   *  11/1992

(Continued)

*Primary Examiner* — Atul P. Khare
(74) *Attorney, Agent, or Firm* — Lorenz & Kopf, LLP

(57) ABSTRACT

Methods for making interior panels are provided. In one example, a method for making an interior panel comprises the steps of heating a fiber reinforced composite blank to form a heated fiber reinforced composite blank. The heated fiber reinforced composite blank is compression molded to shape and cool the heated fiber reinforced composite blank. The heated fiber reinforced composite blank is pierced with a plurality of pins during compression molding to form a shaped, perforated fiber reinforced composite substrate.

14 Claims, 5 Drawing Sheets

(56) References Cited

U.S. PATENT DOCUMENTS

| | | | | |
|---|---|---|---|---|
| 4,552,600 | A * | 11/1985 | Laiewski | B26F 1/24 156/196 |
| 4,942,012 | A * | 7/1990 | Lee | B29C 51/14 264/510 |
| 5,066,442 | A * | 11/1991 | Gutowski | B29C 33/0033 264/154 |
| 5,246,520 | A * | 9/1993 | Scanlon | B29C 70/504 156/245 |
| 5,252,279 | A * | 10/1993 | Gore | B29C 70/545 264/154 |
| 5,283,026 | A * | 2/1994 | Okumura | B29B 13/02 264/234 |
| 5,372,668 | A * | 12/1994 | Bracesco | B29C 63/025 156/212 |
| 5,720,915 | A * | 2/1998 | Joppen | B26F 1/24 264/321 |
| 5,773,115 | A | 6/1998 | Ash | |
| 6,071,444 | A * | 6/2000 | Worrell, Jr. | C06B 45/00 264/156 |
| 6,190,602 | B1 * | 2/2001 | Blaney | B26D 7/086 156/303.1 |
| 6,223,636 | B1 * | 5/2001 | LaPlante | B26F 1/04 83/13 |
| 7,052,634 | B2 * | 5/2006 | Liu | A43B 17/08 264/154 |
| 7,347,961 | B2 * | 3/2008 | Obrachta | B29C 70/44 264/156 |
| 8,128,775 | B2 * | 3/2012 | Maheshwari | B29C 70/545 156/212 |
| 8,567,467 | B2 * | 10/2013 | Maheshwari | B29C 70/545 156/382 |
| 8,696,965 | B2 * | 4/2014 | Bongiovanni | B29C 37/0064 156/286 |
| 2010/0098906 | A1 * | 4/2010 | Bongiovanni | B29C 37/0064 428/138 |
| 2011/0189465 | A1 * | 8/2011 | Maurer | B29C 44/352 428/304.4 |
| 2011/0293914 | A1 * | 12/2011 | Maurer | B29C 44/569 428/304.4 |

FOREIGN PATENT DOCUMENTS

| | | | |
|---|---|---|---|
| JP | | 4327251 A | 11/1992 |
| JP | | 05237924 A * | 9/1993 |

* cited by examiner

METHODS FOR MAKING INTERIOR PANELS FOR MOTOR VEHICLES

TECHNICAL FIELD

The technical field relates generally to interior panels for motor vehicles, and more particularly to methods for making interior panels for motor vehicles including a shaped, perforated fiber reinforced composite substrate that is formed using a compression molding process and that may be covered, for example, with a cover skin using a thermoforming process.

BACKGROUND

Motor vehicles typically include various interior panels such as in the passenger compartment area of the motor vehicle to provide various functions and/or aesthetics. Non-limiting examples of interior panels include instrument panels, door panels, consoles, glove box doors, roof liners, and the like. Some interior panels are configured as covered interior panels that include a cover skin, e.g., a single layer of skin material or a bi-laminate construction that includes a skin layer overlying a foam layer, overlying a substrate to provide an aesthetically desirable finish, e.g., grained and/or padded finish. There are various manufacturing approaches for fabricating such covered interior panels but typically a forming process for the substrate and a different forming process for the cover skin are employed.

In one example disclosed in U.S. Pat. No. 5,773,115, issued to Ash, a coverstock such as a polyvinyl chloride (PVC) skin or the like is thermoformed and joined to a shaped, foam substrate, to form a colored and textured interior auto component. In particular, adhesive is applied to a surface of the shaped, foam substrate and a vacuum is pulled through the shaped, foam substrate which is porous to facilitate thermoforming the coverstock onto the surface of the shaped, foam substrate with the adhesive. Unfortunately, this approach is not practical for many other substrate constructions that may be nonporous or substantially less porous than foam substrates, such as with certain fiber reinforced composite constructions that may be desirable as an interior panel substrate due to their relatively high specific stiffness (e.g., relatively light weight and high rigidity).

Accordingly, it is desirable to provide methods for making interior panels that includes a fiber reinforced composite substrate that may be feasibly covered with a cover skin using, for example, a thermoforming process to form a covered interior panel. Furthermore, other desirable features and characteristics of the present invention will become apparent from the subsequent detailed description and the appended claims, taken in conjunction with the accompanying drawings and this background.

BRIEF SUMMARY

Methods for making interior panels for motor vehicles are provided herein. In accordance with an exemplary embodiment, a method for making an interior panel comprises the steps of heating a fiber reinforced composite blank to form a heated fiber reinforced composite blank. The heated fiber reinforced composite blank is compression molded to shape and cool the heated fiber reinforced composite blank. The heated fiber reinforced composite blank is pierced with a plurality of pins during compression molding to form a shaped, perforated fiber reinforced composite substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
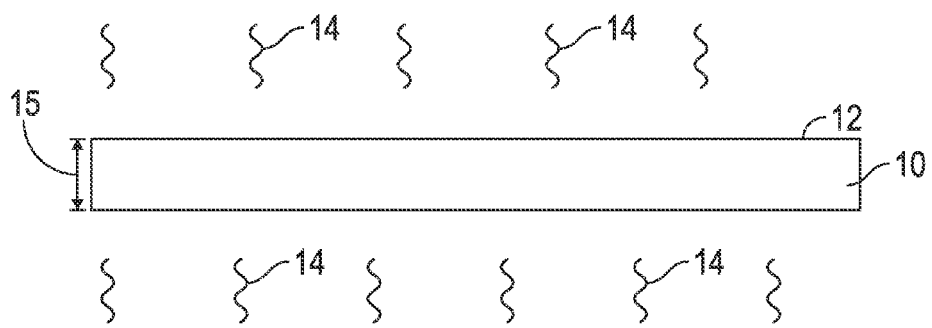
FIG. 1 illustrates, in cross-sectional view, an interior panel for a motor vehicle at an early fabrication stage in accordance with an exemplary embodiment.

The following Detailed Description is merely exemplary in nature and is not intended to limit the various embodiments or the application and uses thereof.

Furthermore, there is no intention to be bound by any theory presented in the preceding background or the following detailed description.

Various embodiments contemplated herein relate to methods for making interior panels for motor vehicles. The exemplary embodiments taught herein provide a fiber reinforced composite blank. The fiber reinforced composite blank may be formed of fibers and resin that binds the fibers together. Non-limiting examples of fibers include inorganic fibers, such as, for example, S-glass fibers, E-glass fibers, carbon fibers, and the like, or organic fibers, such as, for example, natural fibers (e.g. fibers from a lignocellulosic material or other biological source), polyethylene fibers, polypropylene fibers, polyester fibers, polyamide fibers, and the like. Non-limiting examples of resins include thermoplastic resins, such as, for example, polyethylene, polypropylene, polyester, polyamide, and the like or thermoset resins such as polyester, polyurethane, epoxy, and the like. The fibers function as reinforcing elements and the resin functions as a load transferring matrix between the reinforcing elements. In an exemplary embodiment, the fibers are natural fibers and the resin is polypropylene and the natural fibers and polypropylene resin have relatively low densities. As such, the fiber reinforced composite blank can be formed into a structure having a relatively high specific stiffness, e.g., relatively stiff and light weight.

In an exemplary embodiment, the fiber reinforced composite blank is passed through an oven and is heated to form a heated fiber reinforced composite blank that is relatively soft and formable. The heated fiber reinforced composite blank is removed from the oven and is positioned between two matched die halves of a compression mold that is in an opened positioned. The matched die halves are then moved relative to each other along a vertical axis for example to close the compression mold and shape, compress, and cool the heated fiber reinforced composite blank. In an exemplary embodiment, during compression molding before the compression mold is in a fully closed position, a plurality of pins are projected from the upper matched die half to pierce the heated fiber reinforced composite blank while the fiber reinforced composite blank is still warm and being formed into a shaped structure. When the compression molding cycle is completed, the pierced heated fiber reinforced composite blank is shaped, compressed, and cooled to define a shaped, perforated fiber reinforced composite substrate that is relatively stiff and light weight and that has a plurality of holes formed therethrough.

In an exemplary embodiment, the shaped, perforated fiber reinforced composite substrate is removed from the compression mold and positioned in a thermoforming tool. A cover skin is heated to make the cover skin formable and is positioned in the thermoforming tool over the shaped, perforated fiber reinforced composite substrate. In an exemplary embodiment, a vacuum is pulled on a side of the shaped, perforated fiber reinforced composite substrate opposite a side facing the cover skin. The holes in the shaped, perforated fiber reinforced composite substrate allow the vacuum to remove air between the cover skin and the shaped, perforated fiber reinforced composite substrate, thereby creating a vacuum between the cover skin and the substrate to facilitate thermoforming of the skin onto the substrate to form a covered interior panel. Because the shaped, perforated fiber reinforced composite substrate has a plurality of holes formed therethrough, various substrate constructions can be used regardless of their intrinsic porosity compared to foam substrates without practically affecting subsequent thermoforming of a cover skin onto the substrate using a vacuum.

FIG. 1 illustrates, in cross-sectional view, an interior panel 10 for a motor vehicle at an early fabrication stage in accordance with an exemplary embodiment. The fabrication of the interior panel includes providing a fiber reinforced composite blank 12. As discussed above, the fiber reinforced composite blank 12 may be formed of fibers and resin that binds the fibers together. Non-limiting examples of fibers include inorganic fibers, such as, for example, S-glass fibers, E-glass fibers, carbon fibers, and the like, or organic fibers, such as, for example, natural fibers (e.g. fibers from a lignocellulosic material or other biological source), polyethylene fibers, and the like. Non-limiting examples of resins include thermoplastic resins, such as, for example, polyethylene, polypropylene, polyester, polyamide, and the like or thermoset resins such as polyester, polyurethane, epoxy, and the like. In one example, the fibers are natural fibers and the resin is a thermoplastic resin such as polypropylene. In an exemplary embodiment, the fiber reinforced composite blank has a thickness indicated by double headed arrow 15 of from about 10 to about 20 mm, such as from about 12 to about 18 mm.

In an exemplary embodiment, the fiber reinforced composite blank 12 is preheated (indicated by lines 14) to help remove moisture. Removing moisture from the fiber reinforced composite blank 12 has been found to help improve subsequent processing including cycle time and heating and forming of the fiber reinforced composite blank 12. In an exemplary embodiment, the fiber reinforced composite blank 12 is preheated to a temperature of from about 95 to about 115° C.

Figure 2:
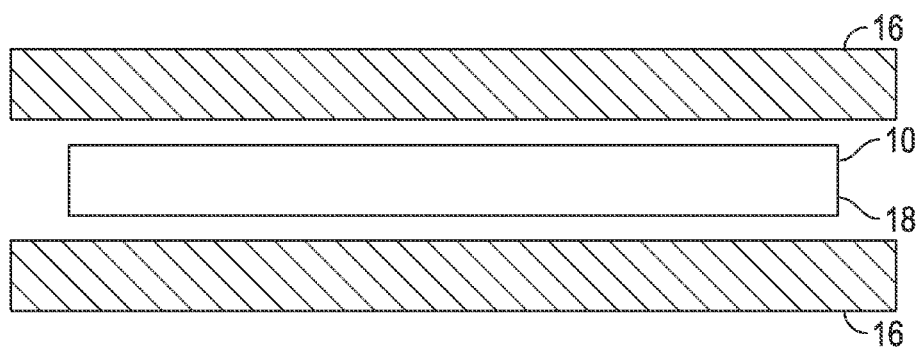
FIG. 2 illustrates, in cross-sectional view, an interior panel for a motor vehicle at a further advanced fabrication stage in accordance with an exemplary embodiment.
Figure 3A:
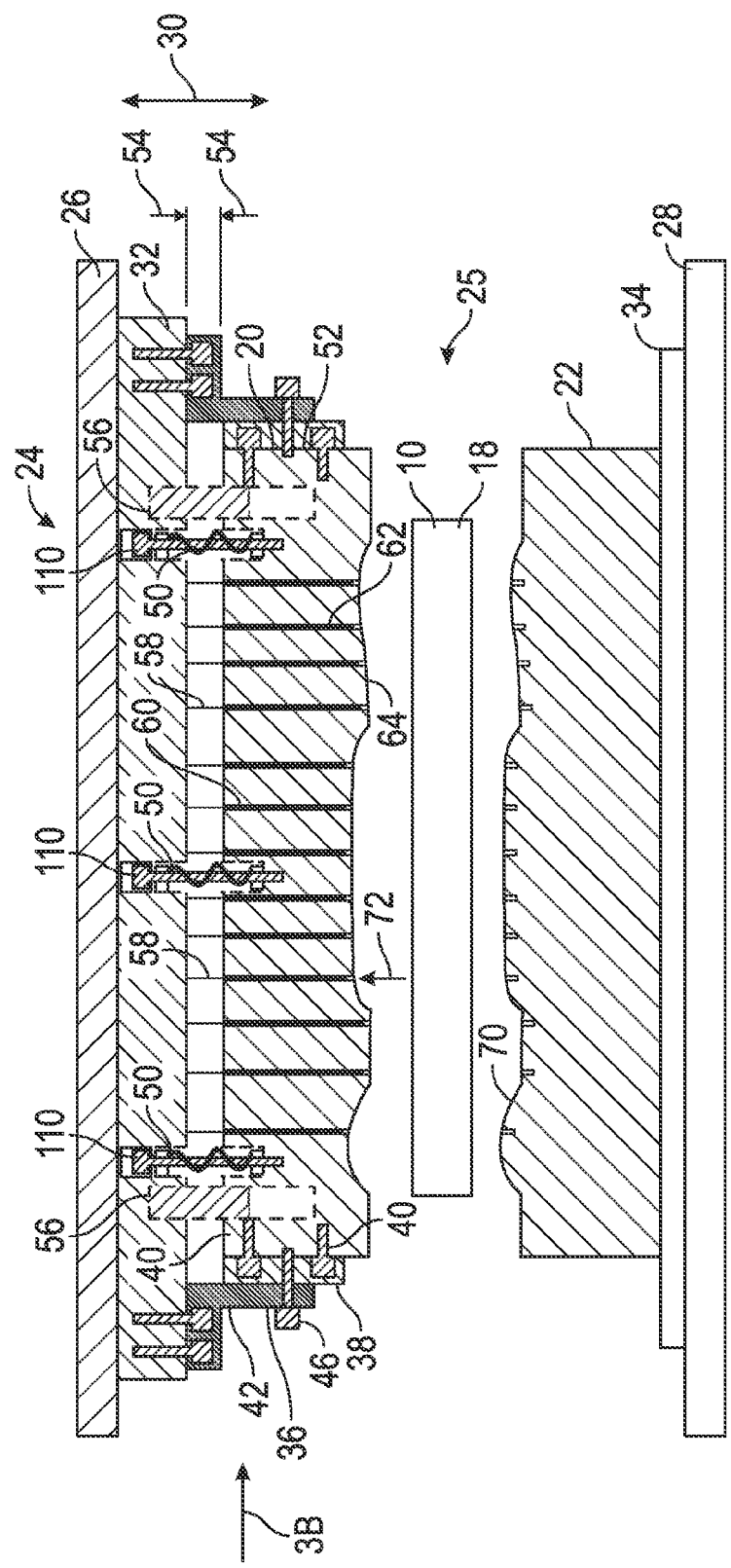
FIG. 3A illustrates, in cross-sectional view, an interior panel for a motor vehicle at a further advanced fabrication stage in accordance with an exemplary embodiment.

FIGS. 2-3A illustrate, in cross-sectional views, the interior panel 10 at further advanced fabrication stages in accordance with an exemplary embodiment. As illustrated, the fiber reinforced composite blank 12 is heated by heaters 16 (e.g., oven with heating elements) to form a heated fiber reinforced composite blank 18. The fiber reinforced composite blank 12 is heated, for example, to a temperature above the glass transition temperature or softening temperature of the resin, e.g., greater than the T(g) of the thermoplastic resin, so that the heated fiber reinforced composite blank 18 is relatively soft and formable. In an exemplary embodiment, the heated fiber reinforced composite blank 18 is formed having a temperature of from about 190 about 250° C. The heated fiber reinforced composite blank 18 is passed along and positioned between matched die portions 20 and 22 of a compression mold arrangement 24 that is in an opened position 25.

As illustrated, the compression mold arrangement 24 is configured including a vertically oriented compression press for compression molding the heated fiber reinforced composite blank 18. The compression mold arrangement 24 includes upper and lower platens 26 and 28 in which the upper platen 26 is configured to move along a vertical axis (indicated by double headed arrow 30) and the lower platen 28 is fixed in position.

Directly coupled to the upper and lower platens 26 and 28 are tool plates 32 and 34, respectively, that are correspondingly coupled to the matched die portions 20 and 22. In an exemplary embodiment and as will be discussed in further detail below, the matched die portion 22 is fixed in position relative to the tool plate 34 and the lower platen 28, and the matched die portion 20 can move relative to the tool plate 32 and the upper platen 26.

Figure 3B:
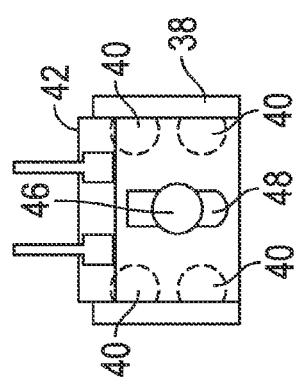
FIG. 3B illustrates, in side view, a guide/mounting plate arrangement in accordance with an exemplary embodiment.

As illustrated in FIGS. 3A-3B, the matched die portion 20 is coupled to the tool plate 32 by guide/mounting plate arrangements 36. The guide/mounting plate arrangements 36 are configured to allow relative movement between the matched die portion 20 and the tool plate 32 which moves correspondingly with the upper platen 26. Each of the guide/mounting plate arrangement 36 includes a mounting plate 38 that is fastened to the matched die portion 20 via fasteners 40 and a guide/mounting plate 42 that is configured as an "L-shaped" bracket and that is fixedly coupled to the tool plate 32 by fasteners 44 and is movably coupled to the mounting plate 38 and the matched die portion 20 via fastener 46. In particular and as illustrated, the guide/mounting plate 42 defines a slot 48 that allows the fastener 46 to move in slot 48 along the vertical axis 30, thereby allowing the matched die portion 20 to move relative to the guide/mounting plate 42, the tool plate 32, and the upper platen 26. In an exemplary embodiment, the mounting plate 38 is a brass plate that is impregnated with carbide to provide relatively low coefficient of friction surfaces for slippage (e.g. relative movement) and the guide/mounting plate 42 is formed of hardened steel.

A plurality of biasing elements 50 (e.g., springs) are positioned between the tool plate 32 and the matched die portion 20 to position the matched die portion 20 relative to the tool plate 32 in an extended position 52. In an exemplary embodiment, a bolt 110 is disposed through each of the biasing elements 50 to couple the tool plate 32 and the matched die portion 20 while still allowing relative movement between the tool plate 32 and the matched die portion 20. As illustrated, in the extended position 52, a gap (indicated by arrows 54) is formed between the tool plate 32 and the matched die portion 22. In an exemplary embodiment, the gap 54 is from about 3 to about 10 mm. As will be discussed in further detail below, guide pins 56 extend from the tool plate 32 into the matched die portion 20 to guide relative movement between the matched die portion 20 and the tool plate 32 substantially along the vertical axis 30.

In an exemplary embodiment, a plurality of pins 58 extend from the tool plate 32 across the gap 54 and into vertically oriented channels 60 that are formed through the matched die portion 20. As illustrated, the pins 58 are in a retracted position 62 when the matched die portion 20 is in the extended position 52. In an exemplary embodiment, the pins 58 are recessed in the matched die portion 20 from a mold surface 64 a distance of from about 1.5 to about 3 mm when the pins 58 are in the retracted position 62. In an exemplary embodiment, the pins 58 have a diameter of from about 0.75 to about 1.5 mm and are spaced apart from each other by a distance of from about 25 to about 100 mm.

Figure 4:
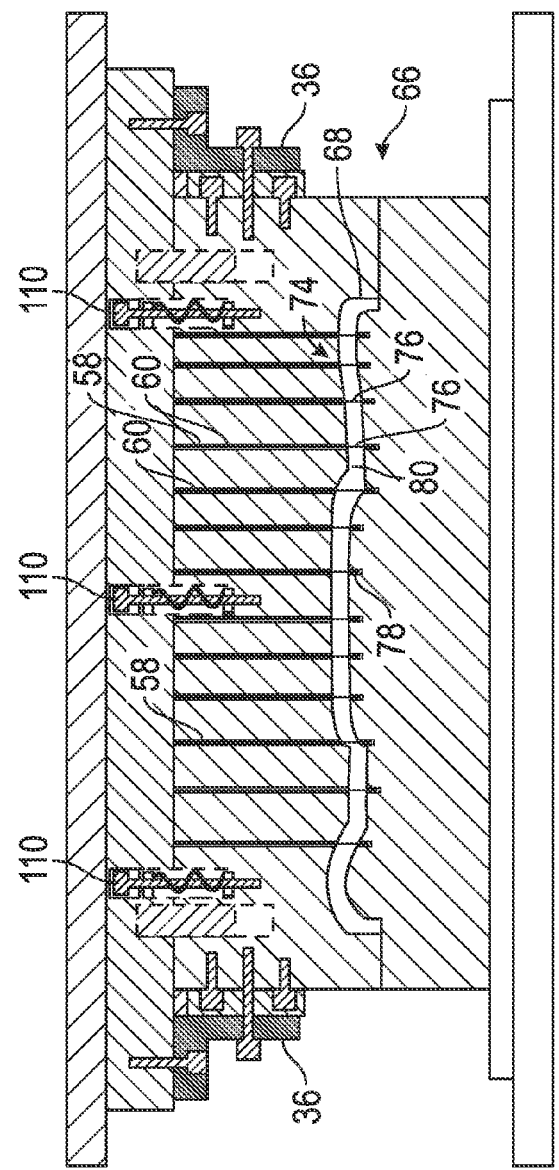
FIG. 4 illustrates, in cross-sectional view, an interior panel for a motor vehicle at a further advanced fabrication stage in accordance with an exemplary embodiment.

Referring to FIGS. 3A and 4, the upper platen 26 advances downward along the vertical axis 30 to move the matched die portions 20 and 22 together from the opened position 25 to a close position 66 to shaped, compress, and cool the heated fiber reinforced composite blank 18. In the close position 66, the matched die portions 20 and 22 form a cavity 68 that is defined by mold surfaces 64 and 70 to define a 3-D shape as is well known in the art. In an exemplary embodiment, as the upper platen 26 advances downward, the mold surface 64 contacts the heated fiber reinforced composite blank 18 which is also in contact with the mold surface 70, thereby creating a resistive force (indicated by arrow 72) on the matched die portion 20. Because the matched die portion 20 is configured to move relative to the tool plate 32 and the upper platen 26, when the resistive force 72 is sufficiently large the matched die portion 20 moves in response to the resistive force 72 towards the tool plate 32 and the upper platen 26 along the vertical axis 30 guided by the guide pins 56 and against the biasing elements 50 (e.g., compressing the biasing elements 50). As such, the gap 54 between the tool plate 32 and the matched die portion 20 diminishes, thereby advancing the pins 58 through the channels 60 to an extended position 74. In an exemplary embodiment, relative movement of the pins 58 is initiated when the matched die portions 20 and 22 are spaced apart a distance of from about 3 to about 6 mm, e.g., from their fully closed position 66. While the pins 58 are advancing towards the extended position 74, the heated fiber reinforced composite blank 18 is pierced by the pins 58, correspondingly forming holes 76 through the heated fiber reinforced composite blank 18. In an exemplary embodiment, the heated fiber reinforced composite blank 18 is relatively soft and has a temperature of from about 170 to about 250° C. to facilitate piercing of the blank 18 with the pins 58. In an exemplary embodiment, the holes 76 have a diameter of from about 0.75 to about 1.5 mm and are spaced apart from each other a distance of from about 25 to about 100 mm. When the matched die portions 20 and 22 are fully in the closed position 66, the pins 58 extend completely through the heated fiber reinforced composite blank 18 and into channels 78 that extend vertically partway into the matched die portion 22. In an exemplary embodiment, the pins 58 in the extended position 74 extend proud of the mold surface 64 a distance of from about 2.5 to about 5 mm and into the matched die portion 22 from the mold surface 70 a distance of from about 1 to about 3 mm when the matched die portions 20 and 22 are in the closed position 66.

In the closed position 66, the heated fiber reinforced composite blank 18 is compressed, cooled, and has a shape defined by the cavity 68 with the holes 76 defined by the pins 58 to form a shaped, perforated fiber reinforced composite substrate 80. In an exemplary embodiment, the shaped, perforated fiber reinforced composite substrate 80 is cooled to a temperature of from about 20 to about 100° C. before moving the matched die portions 20 and 22 back to the opened position 25 and being removed from the compression mold arrangement 24. In an exemplary embodiment, the shaped, perforated fiber reinforced composite substrate 80 has a thickness of from about 2 to about 4 mm.

Figure 5:
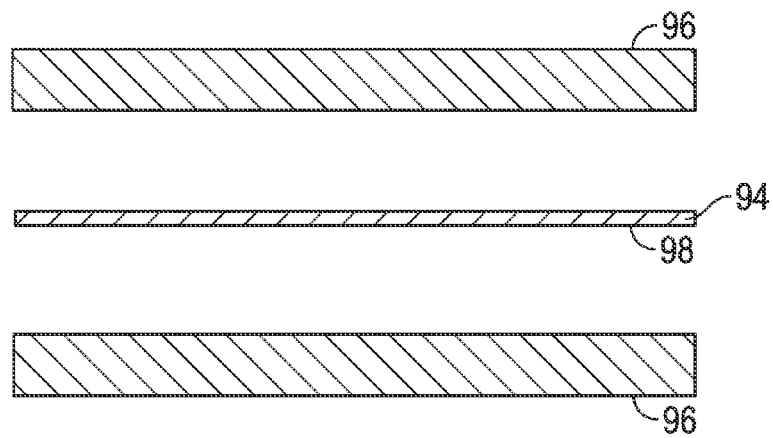
FIG. 5 illustrates, in cross-sectional view, a cover skin for an interior panel at an intermediate fabrication stage in accordance with an exemplary embodiment.
Figure 6:
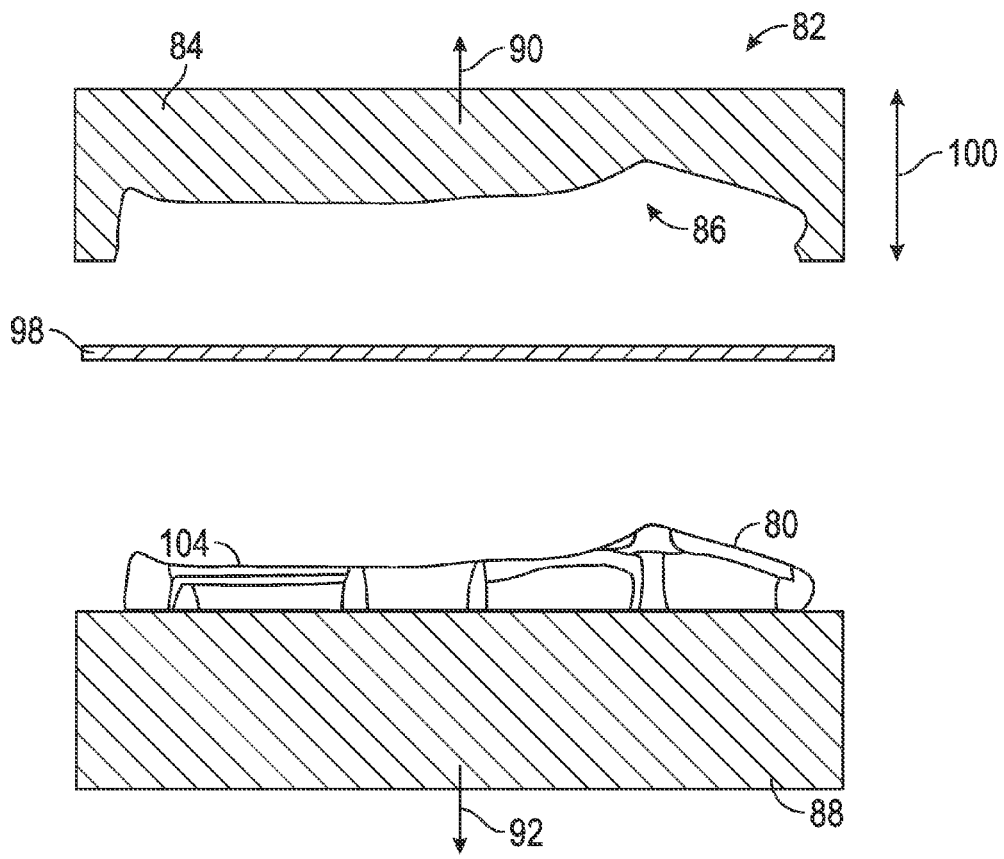
FIG. 6 illustrates, in cross-sectional view, an interior panel for a motor vehicle at a further advanced fabrication stage in accordance with an exemplary embodiment.

Referring to FIGS. 5-6, the method continues by transferring the shaped, perforated fiber reinforced composite substrate 80 to a thermoforming tool 82. As illustrated, the thermoforming tool 82 has an upper die portion 84 that includes a cavity 86, which may be grained or un-grained, and a lower die portion 88 that is configured to fixture the shaped, perforated fiber reinforced composite substrate 80. In an exemplary embodiment, the upper die portion 84 and independently the lower die portion 88 are configured to pull vacuums (indicated by arrows 90 and 92). A cover skin 94 is heated by heating elements 96 to form a heated cover skin 98. In an exemplary embodiment, the cover skin 94 is formed of a thermoplastic material, such as polypropylene, thermoplastic olefin (TPO), polyvinyl chloride (PVC), or the like, and is heated to a temperature above its glass transition temperature to soften the material for formability. In one example, the cover skin 94 is heated to a temperature of about 180 to about 225° C.

Figure 7:
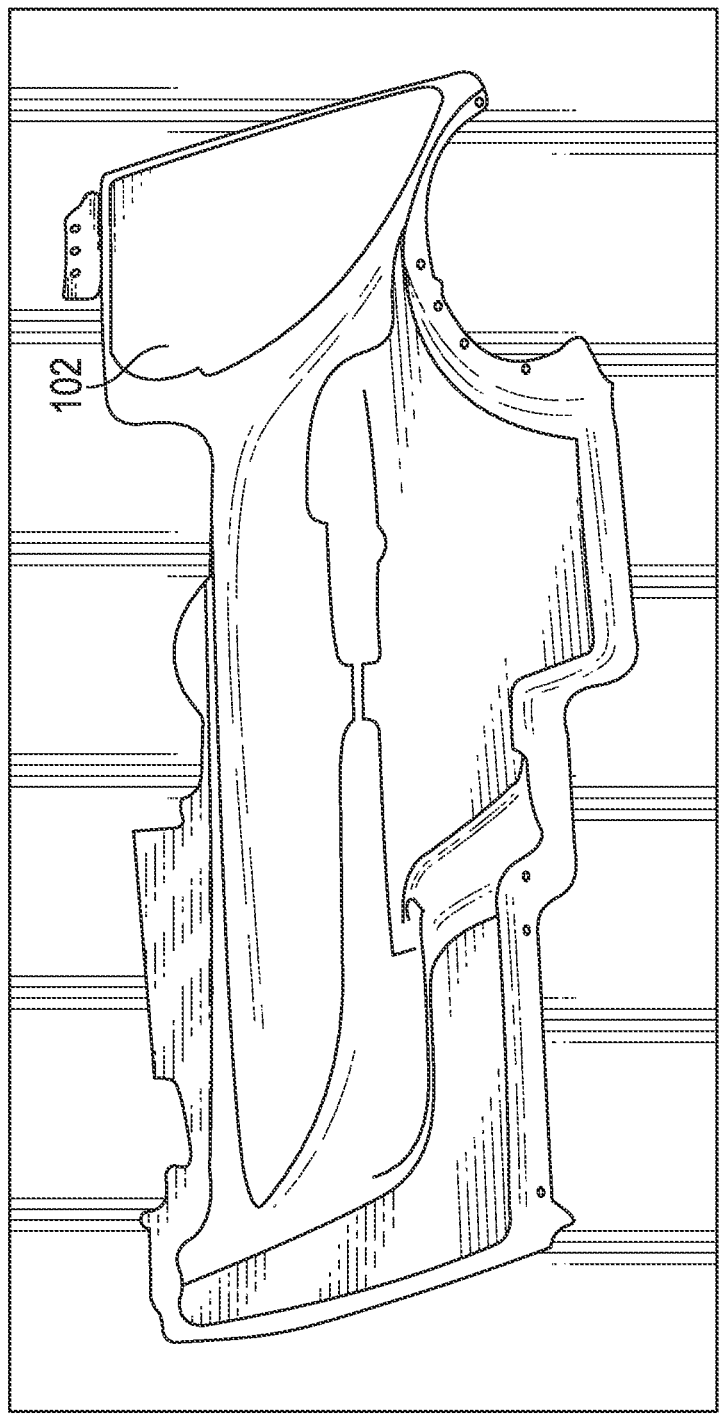
FIG. 7 illustrates, in cross-sectional view, an interior panel for a motor vehicle at a later fabrication stage in accordance with an exemplary embodiment.

The heated cover skin 98 is positioned in the thermoforming tool 82 between the shaped, perforated fiber reinforced composite substrate 80 and the upper die portion 84. The upper and lower die portions 84 and 88 are configured to move relative to each other along a vertical axis (indicated by double headed arrow 100). In an exemplary embodiment, during thermoforming, the heated cover skin 98 is initially pulled or sucked into the cavity 86 by the vacuum 90 as the upper and lower die portions 84 and 88 move towards each other. As the upper and lower die portions 84 and 88 approach a close position, the vacuum 90 is discontinued and the vacuum 92 is initiated. The holes 76 (shown in FIG. 4) in the shaped, perforated fiber reinforced composite substrate 80 allow the vacuum 92 to remove air between the heated cover skin 98 and the shaped, perforated fiber reinforced composite substrate 80, thereby creating a vacuum between the heated cover skin 98 and the substrate 80 to facilitate thermoforming to form a covered interior panel 102 as illustrated in FIG. 7. In an exemplary embodiment, adhesive is applied to the surface 104 of the shaped, perforated fiber reinforced composite substrate 80 prior to thermoforming to help adhere the heated cover skin 98 to the substrate 80.

Accordingly, methods of making interior panels for motor vehicles have been described. In an exemplary embodiment, a fiber reinforced composite blank is heated to form a heated fiber reinforced composite blank. The heated fiber reinforced composite blank is compression molded to shape and cool the heated fiber reinforced composite blank. The heated fiber reinforced composite blank is pierced with a plurality of pins during compression molding to form a shaped, perforated fiber reinforced composite substrate.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method of making an interior panel for a motor vehicle, the method comprising the steps of:
    heating a fiber reinforced composite blank to form a heated fiber reinforced composite blank;
    positioning the heated fiber reinforced composite blank between a first matched die portion and a second matched die portion in an opened position, the first and second matched die portions configured to move relative to each other from the opened position, through a piercing position, to a closed position, and the first and second matched die portions having a matching three-dimensional mold surface shape;
    moving the first matched die portion relative to the second matched die portion from the opened position to the piercing position to compress the heated fiber reinforced composite blank into a heated, partially shaped fiber reinforced composite blank;
    moving the first matched die portion relative to the second matched die portion through the piercing position so as to extend a plurality of pins through the first matched die portion from a retracted position therein towards an extended position, thereby piercing the heated, partially shaped fiber reinforced composite blank with the plurality of pins, said extension being initiated as a result of a resistive force to compressing the heated, partially shaped fiber reinforced composite blank by the first matched die portion during said moving through the piercing position becoming greater than a biasing force of a plurality of biasing elements associated with the first matched die portion and the pins; and
    moving the first matched die portion relative to the second matched die portion from the piercing position to the closed position to form a cooled and perforated fiber reinforced composite blank having a plurality of holes extending completely therethrough formed by the piercing pins and having a shape corresponding to the matching three-dimensional mold surface shape.

2. The method of claim 1, wherein the heating of the fiber reinforced composite blank further comprises:
    forming the heated fiber reinforced composite blank to have a temperature of from about 190° C. to about 250° C.

3. The method of claim 1, wherein the moving from the piercing position to the closed position further comprises:
    cooling the heated fiber reinforced composite blank to a temperature of from about 20° C. to about 100° C. after the piercing.

4. The method of claim 1, wherein said piercing of the heated, partially shaped fiber reinforced composite blank takes place when the heated, partially shaped fiber reinforced composite blank is at a temperature of from about 170° C. to about 250° C.

5. The method of claim 1, wherein said extending of the pins takes place while the first and second die portions are moving relative to each other through the piercing position and to the closed position.

6. The method of claim 5, wherein the extending of the pins is initiated while both of the first and second matched die portions remain in contact with the heated, partially shaped fiber reinforced composite blank from a contact of the first and second matched die portions with the partially shaped fiber reinforced composite blank initiated between the opened and piercing positions.

7. The method of claim 5, wherein the extending of the pins is initiated when the first and second matched die portions are spaced apart by a distance of from about 3 mm to about 6 mm.

8. The method of claim 1, wherein adjacent pins of the plurality of pins are spaced apart a first distance of from about 25 mm to about 100 mm, and wherein the piercing of the heated, partially shaped fiber reinforced composite blank further comprises form the plurality of holes such that adjacent holes of the plurality of holes are spaced apart by a second distance of from about 25 mm to about 100 mm.

9. The method of claim 1, wherein each of the pins has a first diameter of from about 0.75 mm to about 1.5 mm, and wherein the piercing of the heated, partially shaped fiber reinforced composite blank further comprises forming the plurality of holes to each have a second diameter of from about 0.75 mm to about 1.5 mm.

10. The method of claim 1, wherein the first matched die portion is operably coupled to the plurality of biasing elements, the plurality of biasing elements configured to facilitate relative movement between the pins and the first matched die portion during said moving through the piercing position and to the closed position.

11. The method of claim 1, wherein the pins in the retracted position are recessed in the first matched die portion from a mold surface of the first match die portion that contacts the heated fiber reinforced composite blank by a distance of from about 1.5 mm to about 3 mm.

12. The method of claim 1, wherein the pins in the extended position are extending proud from a mold surface of the first matched die portion that contacts the heated fiber reinforced composite blank by a distance of from about 2.5 mm to about 5 mm.

13. The method of claim 1, wherein the pins in the extended position are extending into the second matched die portion a distance of from about 1 mm to about 3 mm when the first and second matched die portions are in the closed position.

14. The method of claim 1, further comprising:
    thermoforming a cover skin to overlie and cover the cooled and perforated fiber reinforced composite blank using the holes to remove air and create a vacuum between the cover skin and the cooled and perforated fiber reinforced composite blank.

* * * * *